United States Patent
Francois et al.

(10) Patent No.: US 10,462,045 B1
(45) Date of Patent: Oct. 29, 2019

(54) TOPOLOGY INDEPENDENT FAST REROUTE FOR NODE AND SRLG LOCAL PROTECTION

(71) Applicant: Cisco Technology, Inc., San Jose, CA (US)

(72) Inventors: Pierre Jean-Rene Francois, Madrid (ES); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 231 days.

(21) Appl. No.: 15/431,560

(22) Filed: Feb. 13, 2017

(51) Int. Cl.
*H04L 12/703* (2013.01)
*H04L 12/24* (2006.01)
*H04L 12/721* (2013.01)
*H04L 12/723* (2013.01)
*H04L 29/06* (2006.01)

(52) U.S. Cl.
CPC .......... *H04L 45/28* (2013.01); *H04L 41/0668* (2013.01); *H04L 45/12* (2013.01); *H04L 45/50* (2013.01); *H04L 69/22* (2013.01)

(58) Field of Classification Search
CPC ..... H04L 45/28; H04L 41/0668; H04L 45/12; H04L 69/22
See application file for complete search history.

(56) References Cited

U.S. PATENT DOCUMENTS 9,253,097 B1 * 2/2016 Barman ............... H04L 47/122
2006/0087965 A1 * 4/2006 Shand ................. H04L 41/0663 370/218
2013/0235716 A1 * 9/2013 Vasseur ................. H04L 12/66 370/221

OTHER PUBLICATIONS

Francois et al. "Topology Independent Fast Reroute using Segment Routing draft-francois-rtgwg-segment-routing-ti-lfa-00" Network Working Group; Aug 17, 2015; pp. 1-10.
Bryant et al. "Remote FLA FRR draft-ietf-rtgwg-remote-lfa-01" Network Working Group; Dec. 19, 2012; pp. 1-13.
Litkowski et al. "Operational Management of Loop Free Alternates draft-ietf-rtgwg-lfa-manageability-11" Routing Area Working Group Jun. 25, 2015; pp. 1-29.
Previdi et al. "Segment Routing with IS-IS Routing Protocol draft-previdi-filsfils-isis-segment-routing-02" IS-IS for IP Internet; Mar. 20, 2013; pp. 1-27.
Filsfils et al. "Loop-Free Alternate (LFA) Applicability in Service Provider (SP) Networks" Internet Engineering Task Force (IETF); Jun. 2012; pp. 1-35.

* cited by examiner

*Primary Examiner* — Huy D Vu
*Assistant Examiner* — Nizam U Ahmed
(74) *Attorney, Agent, or Firm* — Behmke Innovation Group LLC; James M. Behmke; Stephen D. LeBarron

(57) ABSTRACT

In one embodiment, a device in a network identifies a shortest path tree for a point of local repair in the network that excludes at least one link between the point of local repair and a neighbor of the point of local repair in the network. The device evaluates member nodes of a branch of the shortest path tree, to form a list of repair segments. The device further causes one or more segment routing labels to be added to a header of a packet based on the repair segment list and in response to a failure in the network associated with the at least one link excluded from the shortest path tree.

20 Claims, 12 Drawing Sheets

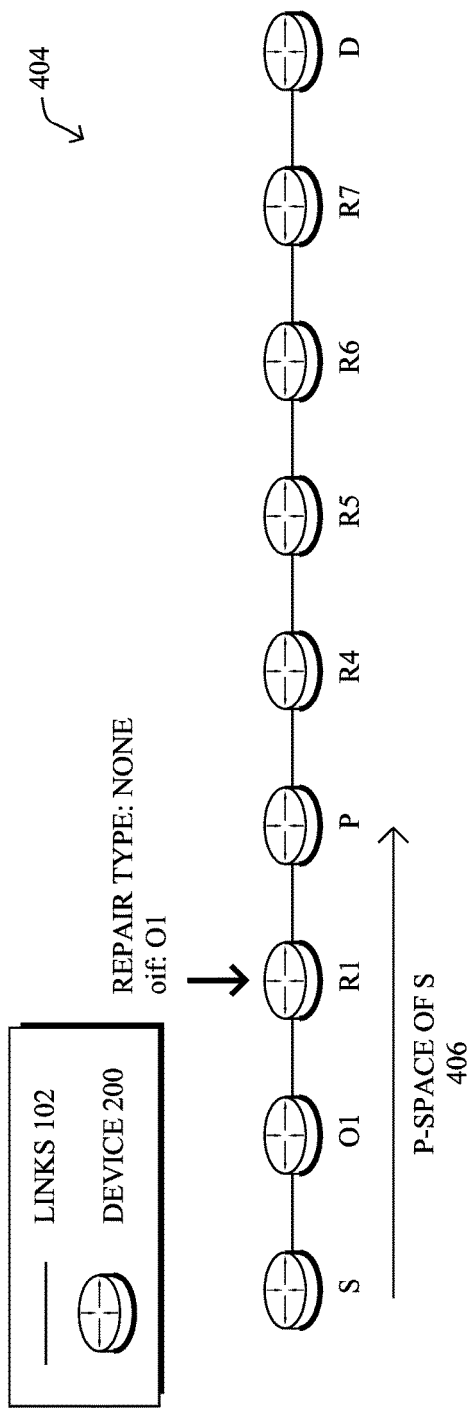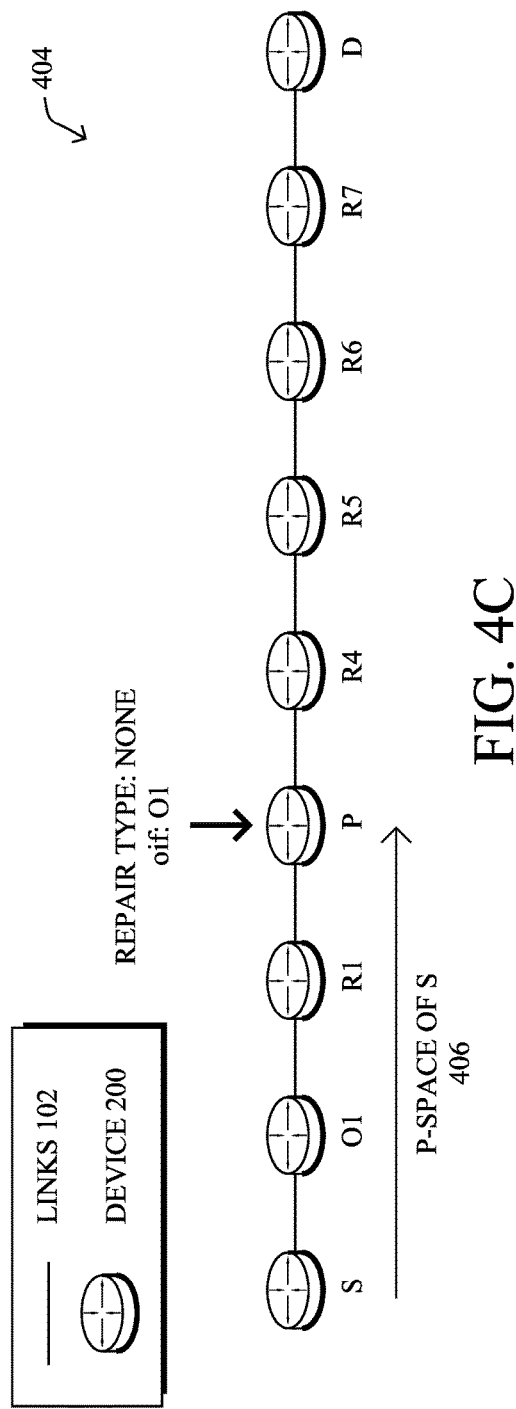
FIG. 4B
FIG. 4C

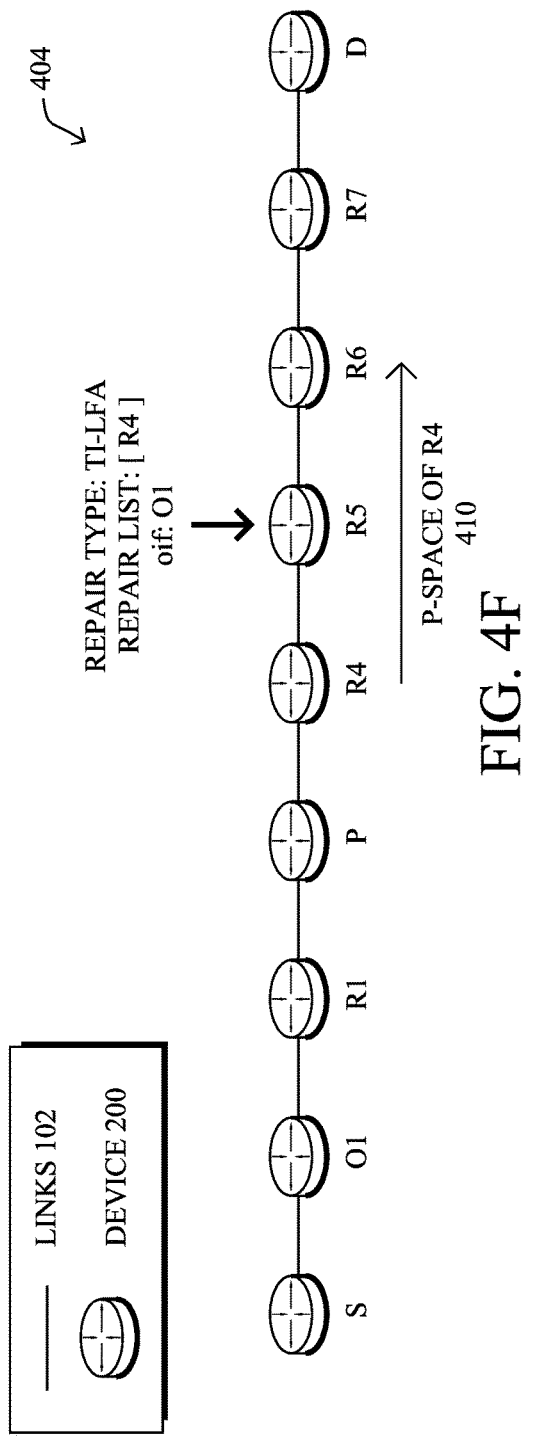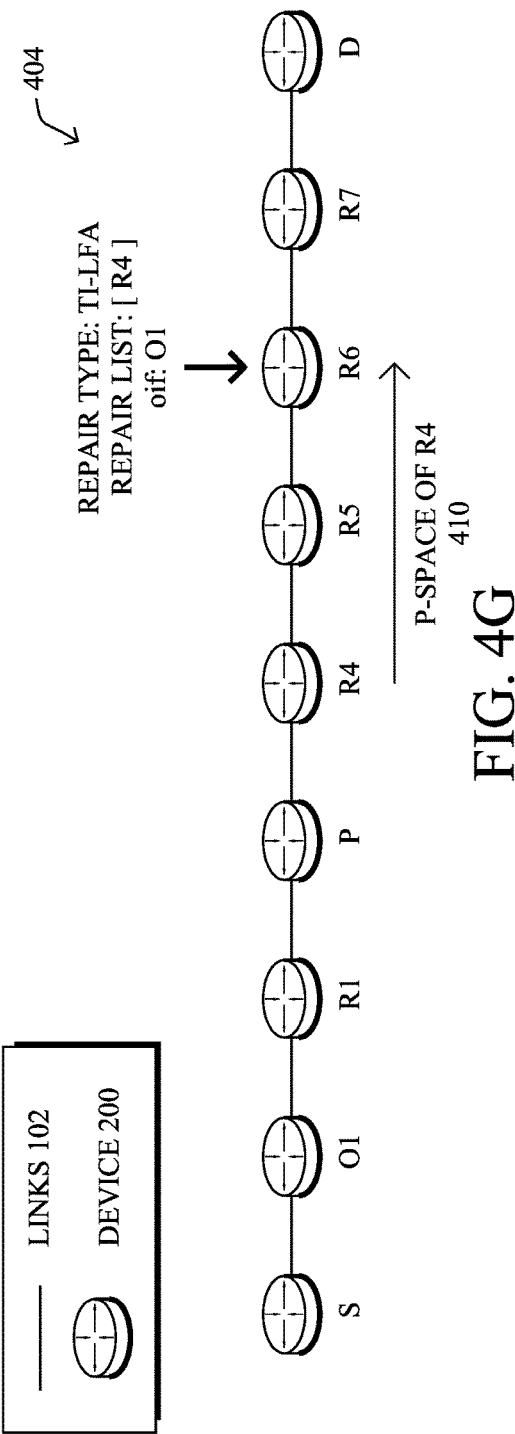

TOPOLOGY INDEPENDENT FAST REROUTE FOR NODE AND SRLG LOCAL PROTECTION

TECHNICAL FIELD

The present disclosure relates generally to computer networks, and, more particularly, to a topology independent fast reroute for node and shared risk link group (SRLG) protection.

BACKGROUND

Multiprotocol label switching (MPLS) is a packet switching technology that allows routing decisions to be based on labels that are prepended to the headers of packets. Such a label represents a path in the network and is used to make forwarding decisions until the corresponding packet reaches its destination. Once the packet reaches its destination, the destination device may "pop" (e.g., remove) the corresponding label from the header of the packet and/or apply another label to the packet, to continue routing the packet throughout the network.

The Resource Reservation Protocol (RSVP) is another networking technology that can be used in various forms of networks, such as MPLS-based networks. More specifically, when used in an MPLS-based network, RSVP provides mechanisms to gather metrics regarding the network (e.g., in terms of bandwidth, jitter, etc.) and, based on the gathered metrics, provide quality of service (QoS) guarantees for certain traffic types by reserving resources. For example, RSVP may be used to reserve network resources for real-time voice and video traffic, to guarantee at least a minimum level of performance. As network conditions can change over time, RSVP also facilitates the reallocation of resources and/or initiation of routing changes in the network. For example, RSVP can be used to enable fast rerouting (RSVP-FRR) in the case of a failure, by switching the traffic to a different network path.

However, approaches such as RSVP require the signaling of explicit tunnels in advance of a failure. Also, the detour path followed by packets is typically misaligned with the capacity planning of the network. Further, RSVP-FRR puts the tunnel head-end in charge of the failover, leading to non-local, signaling-based service recovery instead of local behavior.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4I illustrate an example greedy approach for determining repair segments for a fast reroute (FRR) path;

DESCRIPTION OF EXAMPLE EMBODIMENTS

Overview

Figure 1:
FIG. 1 illustrates an example communication network.

According to one or more embodiments of the disclosure, a device in a network identifies a shortest path tree for a point of local repair in the network that excludes at least one link between the point of local repair and a neighbor of the point of local repair in the network. The device sequentially evaluates member nodes of a branch of the shortest path tree from the point of local repair to a destination node in the shortest path tree by making a determination as to whether a member node currently under evaluation is in a P-space of a reference member node in the branch between the member node currently under evaluation and the point of local repair. The P-space for the reference node comprises a set of nodes that are reachable by the reference node without traversing the at least one link excluded from the shortest path tree. The device further evaluates the member nodes of the branch by adding a repair segment associated with a member node that is in the P-space of the reference node to a repair segment list, when the determination indicates that the member node currently under evaluation is not in the P-space of the reference member node. The device additionally evaluates the member nodes of the branch by setting the member node currently under evaluation as the reference node, when the determination indicates that the member node currently under evaluation is not in the P-space of the reference member node. The device further causes one or more segment routing labels to be added to a header of a packet based on the repair segment list and in response to a failure in the network associated with the at least one link excluded from the shortest path tree.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

FIG. 1 is a schematic block diagram of an example computer network 100 illustratively comprising nodes/devices 200, such as a plurality of routers/devices interconnected by links or networks, as shown. For example, customer edge (CE) routers (e.g., CE1 and CE2) may be interconnected with provider edge (PE) routers (e.g., PE1 and PE2, respectively), to communicate across a core network 104, such as an illustrative Multi-Protocol Label Switching (MPLS) core network. Data packets 106 (e.g., traffic/messages) may be exchanged among the nodes/devices 200 of the computer network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 2:
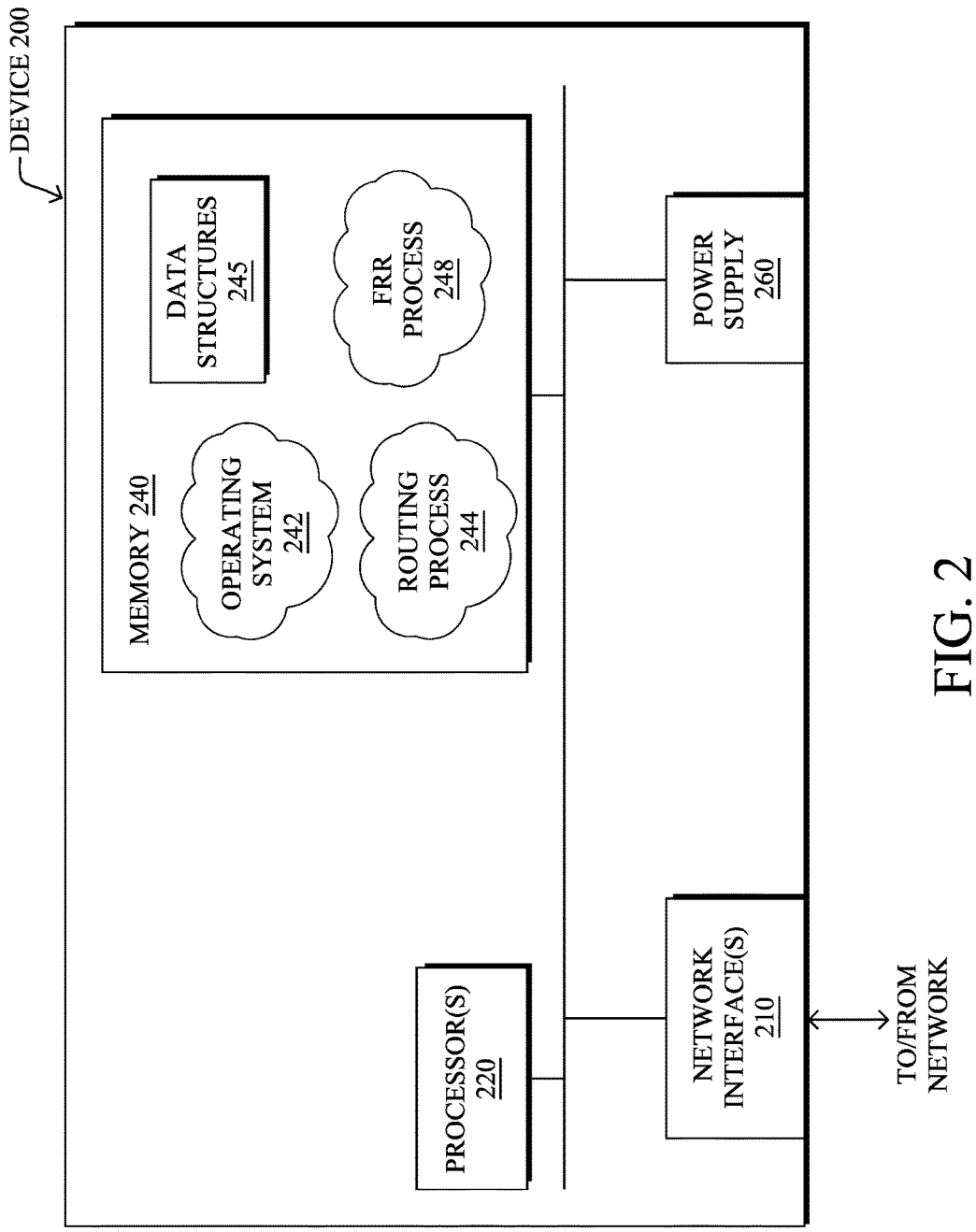
FIG. 2 illustrates an example network device/node.

FIG. 2 is a schematic block diagram of an example node/device 200 that may be used with one or more embodiments described herein, e.g., as any of the routers of network 100, or any other computing device that supports the operations of network 100 (e.g., switches, etc.). Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may include a routing process 244 and/or a fast reroute (FRR) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

According to further embodiments, routing process 244 may support segment routing. Briefly, segment routing may be enabled in a network through the use of IGP extensions that allow IGP messages to carry label information. Segments in a segment routed network may fall into one of two categories: node segments and adjacency segments. Adjacency segments generally represent the local interface between a given node and an adjacent neighbor. Notably, adjacency segments do not need to be unique among the different nodes, as adjacency segments only require local significance to the particular node. Node segments, in contrast, are global in nature and use unique identifiers to represent node segment endpoints. When used in conjunction with multiprotocol label switching (MPLS), segments (e.g., node and adjacency segments) may be treated as labels, whereby a node may either "push" a new segment/label onto the stack, "pop" (e.g., remove) the top segment/label from the stack, or "swap" the top label of the stack with another label.

FRR process/services 248 may operate in conjunction with routing process/services 244 to provide FRR capabilities in the network. Generally, FRR is a mechanism that allows a network to adapt quickly to a link or node failure. In particular, FRR allows a network node, referred to as a point of local repair, to detect a routing failure and quickly adapt routing decisions to avoid the point of failure in the network. Routing failures may fall under one of two categories: link failures and node failures. In general, link and node failures differ in that other links may still be available to a given node if one of the links to the node fails, whereas no links to the node would be available if the node itself fails.

As noted above, segment routing enables any node (e.g., server, PE, etc.) to select any explicit path for each of its traffic classes. This explicit path also does not depend on a hop-by-hop signaling technique, such as the Label Distribution Protocol (LDP) or the Resource Reservation Protocol (RSVP). Instead, the segment routing path only depends on a set of "segments" that are advertised by the link-state routing protocol. These segments act as topological sub-paths that can be combined together to form the desired explicit path. Additionally, the segment routing control plane can be applied to the MPLS dataplane. Notably, a nodal segment to node N is instantiated in the MPLS dataplane as a label switched path (LSP) along the shortest-path to the node. Similarly, an adjacency segment is instantiated in the MPLS dataplane as a cross-connect entry pointing to a specific egress datalink.

With respect to implementing FRR in a segment routed network, FRR process 248 may use any number of existing approaches. However, many available FRR approaches require relatively large overheads in terms of computational and signaling costs, as well as capacity planning by the network operator, to protect against node and local SRLG (e.g., linecard) failures. For example, RSVP-FRR puts the tunnel head-end in charge of the failover, leading to non-local, signaling based service recovery instead of local behavior. In another example, per-prefix, loop-free alternative (LFA)-based FRR allows the IGP to precompute and preinstall a backup path per IGP destination route. However, the availability of a backup path for a given destination is not guaranteed and depends on the topology. Similarly, remote LFA extends the probability of finding a backup path, but is not yet guaranteed to work in any topology. In particular, this mechanism requires directed LDP sessions, which many operators do not like for scaling and operational reasons. In yet a further example, directed LFA (DLFA) guarantees the availability of a backup path for link protection in symmetric networks and does not require directed LDP session, but does not provide node or linecard protection with guaranteed coverage. Likewise, IP-FRR approaches do not necessarily put the FRR path over the path desired by the operator, thus requiring complex management features to adjust the FRR path selection. Finally, the coverage of current IP-FRR is only partial, depending on the shape of the network, the link metric configurations, and the desired type of protection (link, node, SRLG). In other words, while many existing FRR approaches are available, none of the existing approaches provide FRR path at the Point of Local Repair (PLR), aligned with the capacity planning performed by the operator, at low computational and without signaling cost, for node and local SRLG (e.g. linecard) protection.

Topology Independent Fast Reroute for Node and SRLG Local Protection

The techniques herein leverage segment routing to enable FRR protection paths against node and SRLG failures, with minimal computational overhead and still guaranteeing full protection coverage. In some aspects, the protection paths computed using the techniques herein match the post-convergence paths, which are naturally defined by the IGP, from the protecting node to the protected destination. In doing so, this aligns the determined paths with the capacity planning classically performed by network operators. In doing so, this drastically reduces the management overhead of FRR in IP networks.

Specifically, according to one or more embodiments of the disclosure as described in detail below, a device in a network identifies a shortest path tree for a point of local repair in the network that excludes at least one link between the point of local repair and a neighbor of the point of local repair in the network. The device sequentially evaluates member nodes of a branch of the shortest path tree from the point of local repair to a destination node in the shortest path tree by making a determination as to whether a member node currently under evaluation is in a P-space of a reference member node in the branch between the member node currently under evaluation and the point of local repair. The P-space for the reference node comprises a set of nodes that are reachable by the reference node without traversing the at least one link excluded from the shortest path tree. The device further evaluates the member nodes of the branch by adding a repair segment associated with a member node that is in the P-space of the reference node to a repair segment list, when the determination indicates that the member node currently under evaluation is not in the P-space of the reference member node. The device additionally evaluates the member nodes of the branch by setting the member node currently under evaluation as the reference node, when the determination indicates that the member node currently under evaluation is not in the P-space of the reference member node. The device further causes one or more segment routing labels to be added to a header of a packet based on the repair segment list and in response to a failure in the network associated with the at least one link excluded from the shortest path tree.

Illustratively, the techniques described herein may be performed by hardware, software, and/or firmware, such as in accordance with the fast reroute (FRR) process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols and, as such, may be processed by similar components understood in the art that execute those protocols, accordingly.

Operationally, the techniques herein leverage segment routing to perform FRR with guaranteed coverage over the post-convergence paths to the destinations, following IGP metrics and independent from the topology shape, using intermediate segments when needed. Such intermediate segments are used to ensure loop-freeness over the post-convergence path right after the failure has been detected, despite the potentially outdated state of the forwarding table (FIB) of the routers located along that path. In other words, the techniques herein enforce FRR paths that match those obtained with the regular IGP convergence process (e.g., IGP convergence will eventually happen over the post-convergence paths). From capacity planning and FRR management standpoints, the techniques herein provide the necessary encapsulation to ensure loop-freeness over the path defined by the IGP, which is the one the operator has configured and planned for, with regular convergence in mind. The proposed approach outputs a solution that comprises the sequence of segment identifiers (SIDs) that encode the desired repair path, while minimizing the size of the selected repair SID stack.

Figure 3:
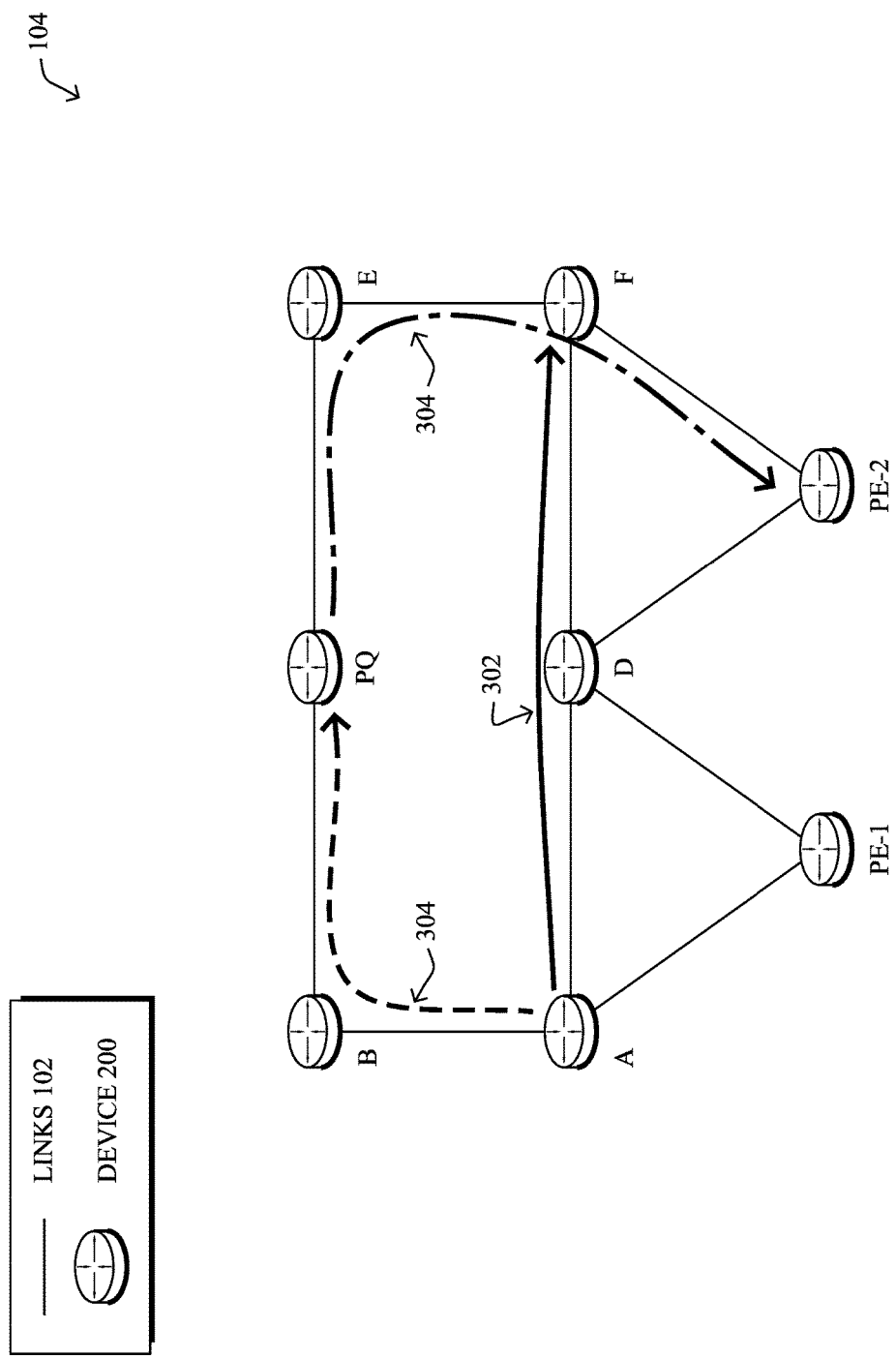
FIG. 3 illustrates an example of paths in a network.

Referring now to FIG. 3, an example of paths in a network is shown, according to various embodiments. Consider, for example, the various networking devices/nodes 200 shown between PE-1 and PE-2 in core network 104. During normal operation, PE-1 may send traffic to destination PE-2 via path 302 that includes nodes A, D, and F. To protect against failures associated with node D, the system may determine a FRR path 304 that instead traverses nodes B, PQ, E, and F, such as when node D is unavailable. Notably, to ensure that a packet is sent over path 304 from the point of local repair, node A, and in the case of a node failure at D, the techniques herein may identify the repair segments that correspond to FRR path 304. In doing so, the identified segments (e.g., nodal and/or adjacency segments) may be added to the header of the packets being sent from PE-1 to PE-2, thereby leveraging segment routing for the reroute.

According to various embodiments, the techniques herein may use a greedy approach to identify the repair segments needed to implement an FRR path. In general, the approach leverages two main building blocks: 1.) greedily walking over the new shortest path tree of the point of local repair, S, and 2.) mathematically assessing the loop-freeness of intermediate steps. During the greedy walk through the shortest path tree, which is applicable to both the node-protection and SRLG-protection modes, the techniques may construct the repair path for all protected destinations. As a new member of a branch in the tree is encountered/analyzed, the repair stack for the current node is built, based on the protection that was discovered for its predecessor(s) along the branch. During this assessment, the techniques may also apply a mathematical function to ensure loop-freeness, as detailed below.

Figure 4A:
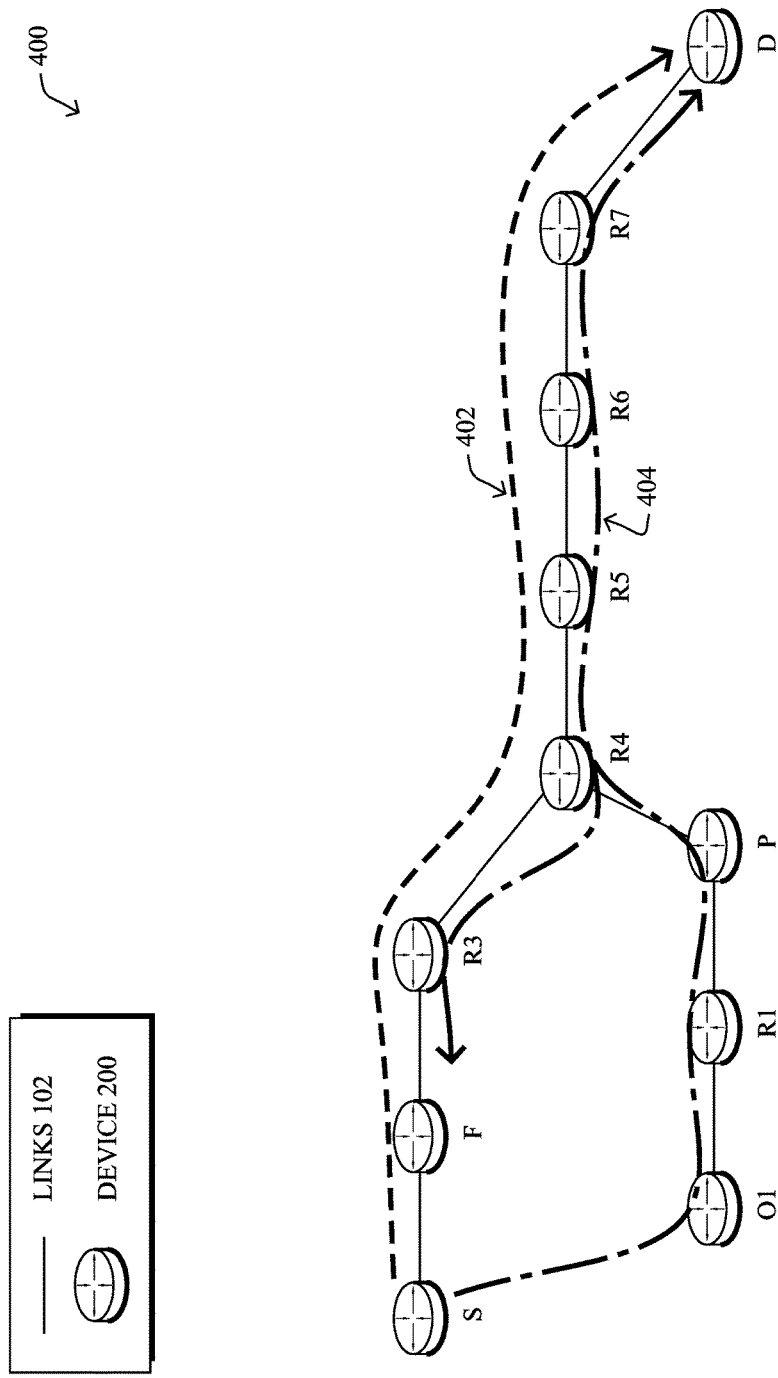

FIGS. 4A-4I illustrate an example greedy approach for determining repair segments for a FRR path, according to various embodiments. As shown in FIG. 4A, assume that a point of local repair (denoted '5') is connected to a destination node (denoted "D") via a shortest path 402 and is to protect against a failure associated with a failure node (denoted "F"). As would be appreciated, the failure being protected against may be a link failure (e.g., a failure in the S-D link), a node failure (e.g., a failure of the node D), or a local SRLG failure, in various cases.

In various embodiments, the system may identify a shortest path tree that excludes the links, nodes, or SRLG to be protected against failure. For example, in node protection mode, all of the links associated with the failure node may be excluded when constructing the tree. In local SRLG mode, all of the links adjacent to the protecting node that belong to that SRLG may be excluded from the tree. Computation of the tree can be performed using Dijkstra's algorithm, or the like.

Assume, for example, that the system is to protect against a node failure of node F, which lies along the current path 402. In such a case, the system may construct a shortest path tree for node S by first excluding the links associated with node F from consideration, such as links S-F and F-R3. Thus, without link S-F, the shortest path from node S to destination node D traverses output interface O1, R1, P, and R4-R7. As would be appreciated, the example shown is a simplistic case and that some of the nodes along the path from S to D in shortest path tree 404 may also be linked to the failure node F.

As shown in FIG. 4B, once the shortest path tree 404 has been constructed to exclude the point(s) of failure that are being protected against, the system may proceed to employ a greedy approach to identifying the necessary repair segments along a given branch. For example, consider the branch of shortest path tree 404 that connects node S with destination node D via O1-R1-P. In such a case, the system may sequentially evaluate each member along the branch, to identify the repair segment(s) for the member and based on the repair segment(s) of it predecessors along the branch.

To evaluate a given member of the shortest path tree branch, the system may employ a function that assesses the P-space of a given node. In general, a P-space comprises the set of node(s) that can be reached by a reference node in the case of failure of a given node, set of links, or SRLG. For example, the P-space of node S with respect to failure node F includes those nodes that can still be reached safely without any specific change in behavior (e.g., S can still reach O1, R1, P, etc.). Thus, a corresponding remote P-space check (RP) function may take as input three parameters: 1.) the reference node, 2.) the node under analysis, and 3.) the node, set of links, or SRLG to be excluded, and output a binary decision as to whether the node under analysis is in the P-space of the reference node with respect to the excluded node, links, etc. (e.g., by outputting 'True' or 'False'). For example, RP(S, O1, F) would indicate that O1 is indeed in the P-space of S with respect to failure node F.

Since, by definition, members of the shortest path tree 404 that are in the P-space of node S are still reachable by S without any configuration changes, evaluation of each of these members will not affect the list of repair segments. For example, in FIG. 4B, when member node R1 is evaluated, the system may assign a repair type of 'none' to node R1, since it is still in the P-space of the reference node, S. Similarly, in FIG. 4C, since node P is also in the P-space of S with respect to failure node F, no repair segments are necessary at this time.

Figure 4D:
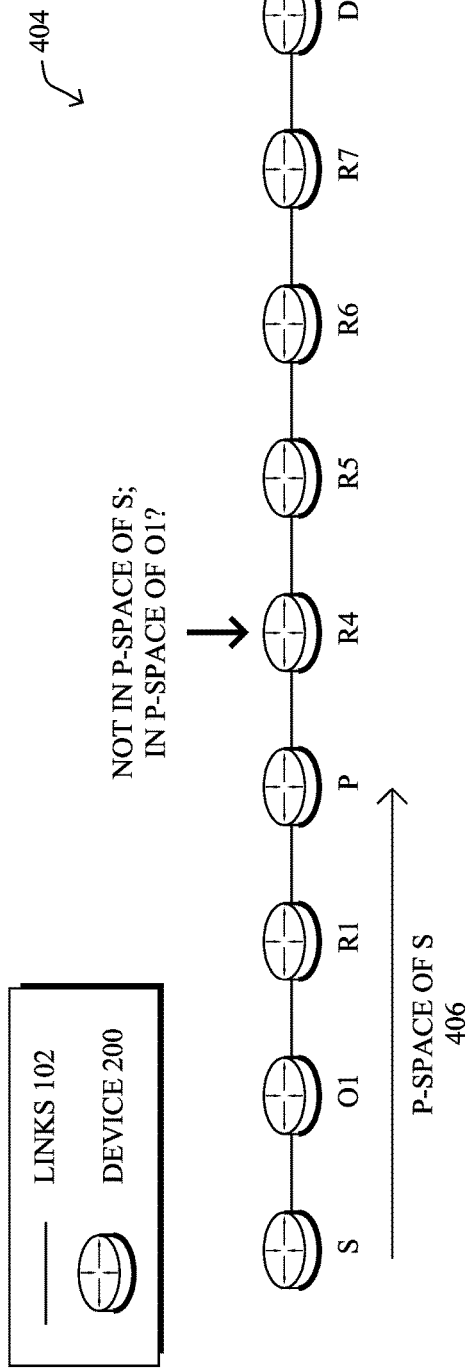
Figure 4E:
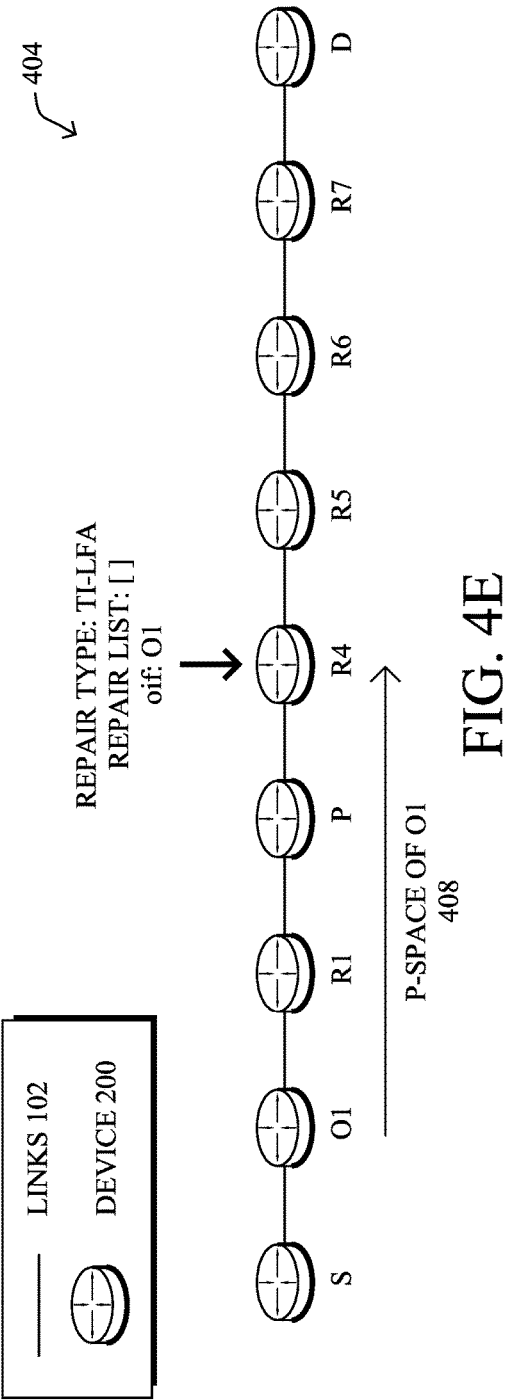

For purposes of illustration, assume that node P represents the boundary of the P-space for node S with respect to failure node F. In other words, assume that node P cannot reach node R4 when node F is excluded from the shortest path tree. As shown in FIG. 4D, this means that R4 is the first node encountered along the branch of the shortest path tree that requires a repair. In turn, the system may determine whether R4 is in the P-space of O1, instead. Now, assume that R4 is indeed in the P-space of O1 with respect to failure node F, as shown in FIG. 4E. In this case, the system may assign a repair type of 'TI-LFA' to R4 and an output interface (oif) set to O1, as nodes in the P-space of O1 with respect to failure node F can be reached by sending packets to O1 (without encapsulation). The evaluation then continues on to the next member of the branch, R5.

As shown in FIG. 4F, assume now that R5 is outside of the P-space of O1 with respect to node F, but is within the P-space of R4 with respect to node F. During the evaluation of R5, the system may first determine that R5 cannot be reached directly from O1 (e.g., using the RP function), which again indicates that a repair is needed. In turn, the system may make R4, which is reachable from O1, the new reference node and then check to see whether R5 can be reached directly from R4 (e.g., R5 is in the P-space of R4). Since R5 can be reached from R4, the repair for R5 may be based on the prior repairs along the path. Notably, the repair segment for R4 may be added to the repair_list for R5 and using oif=O1.

In FIG. 4G, assume that the next member node under evaluation, R6, is also in the P-Space of the reference node R4. In other words, since R4 can safely reach R6, R4 is also a safe release point for a packet to R6. Thus, the repair for R6 may carry over the repair information from that of R5, including the repair list that includes the repair segment associated with R4.

Figure 4H:
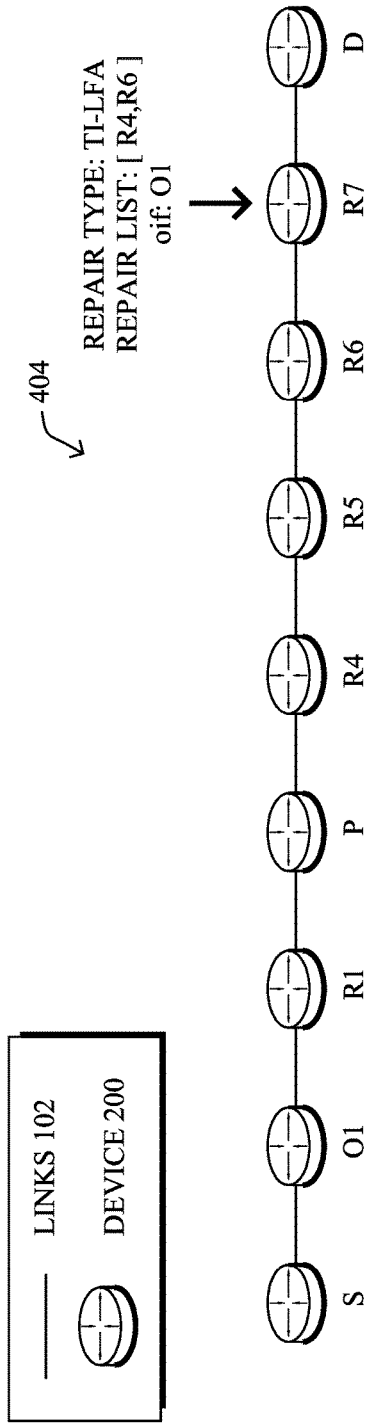

As shown in FIG. 4H, assume that the next member node under evaluation, R7, is outside of the P-space of R4 with respect to F. In such a case, the system may then use R6 as the reference node, since R6 is still in the P-space of R4, to determine whether R7 is in the P-space of R6 with respect to F. Since it is, the repair for R7 may be based on that of the prior nodes, with the addition of a repair segment for R6 added to the repair segment list. In other words, at this point, the system knows that R7 can be reached using [R4, R6], oif: O1. The evaluation then continues on to the final node in the branch, destination node D.

Figure 4I:
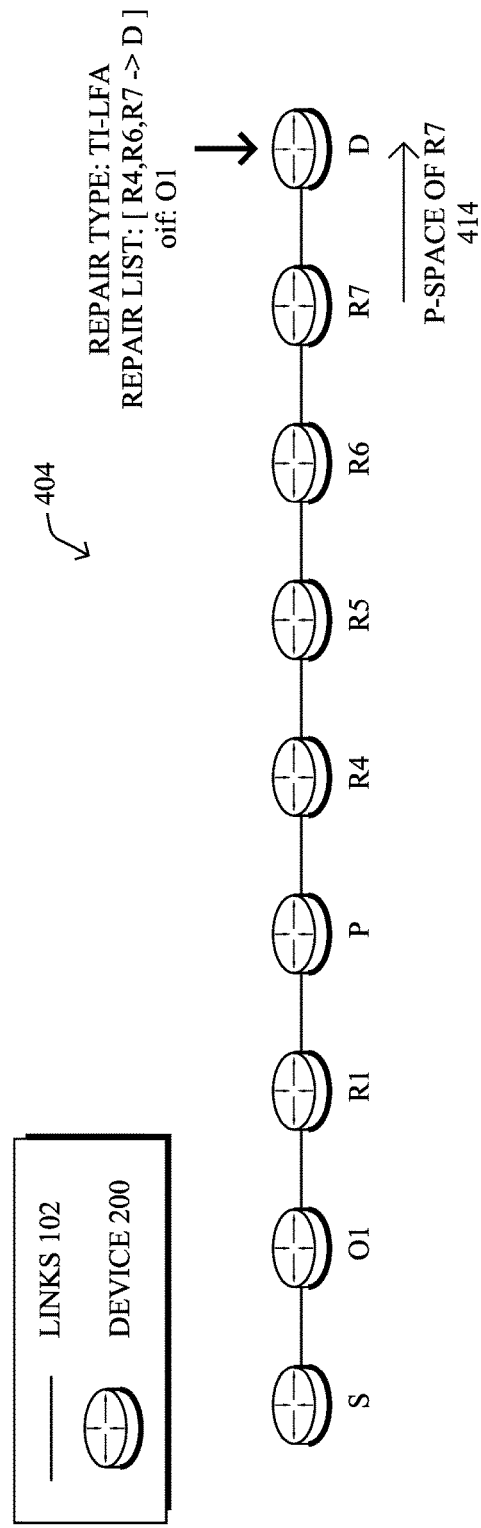

As shown in FIG. 4I, assume that node D is not in the P-space of R7 with respect to F. In such a case, a packet for D cannot simply be released at R7. To prevent R7 from looping D back towards S, the system may enforce the link R7→D by adding a repair adjacency segment to the repair list for D with oif: O1. Note that an adjacency SID is not always required on the last hop, but only when the destination node is not in the P-space of its predecessor, which should be a rare occurrence.

As a result of the greedy evaluation of the member nodes along the branch of the shortest path tree that excludes the failure point(s), the system now has a repair list of repair labels that can be used for purposes of implementing the FRR path. In turn, when a failure is detected with respect to F, packets can be sent via the FRR path by inserting the segment routing labels into the headers of the packets that correspond to the repair list identified using the greedy evaluation of the member nodes along the path.

Thus, the greedy, sequential evaluation of the member nodes along the branch can be summarized as follows:
Identify the shortest path tree for S that excludes F, SPT(S,\F)
Perform a greedy walk along the branch of SPT(S,\F) until the border of the P-space of S with respect to F is reached (e.g., P). At this point, no repairs are needed.

Once the border of the P-Space of the first hop O1 on the branch is reached (e.g., a node XP), set the repair with no SIDs and oif: O1.

Proceed along the branch until the border of the P-Space of XP is reached with respect to F (e.g., a node RP1). At this point, update the repair to include the SID of XP, resulting in a repair of [XP], oif: O1. This may repeat any number of times as the borders of the P-Spaces for the reference nodes are reached, thereby adding to the repair list (e.g., [XP, RP1] becomes [XP, RP1, RP2], etc.).

When the final hop X is reached to the destination Y, add the adjacency SID for X→Y, when Y is not in the P-space of X with respect to the failure point(s).

Figure 5:
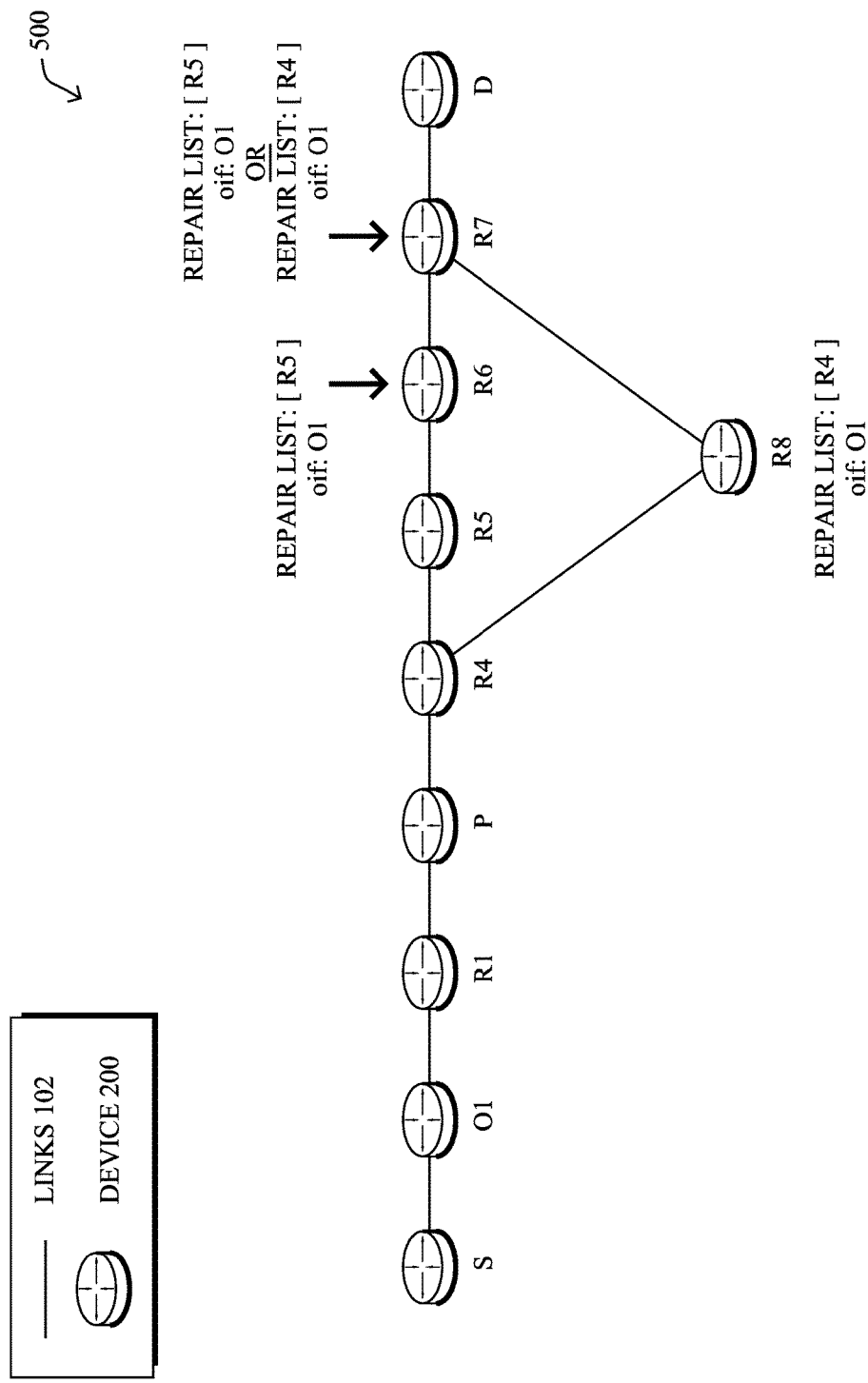
FIG. 5 illustrates an example approach for determining a repair segment in the case of equal-cost multipath (ECMP) routing.

As shown in FIG. 5, a special case may exist when equal-cost multipath (ECMP) routing is used in the network, according to various embodiments. In such cases, a given node on a branch of the shortest path tree that excludes the failure point(s) may have multiple predecessors. For example, continuing the example of FIGS. 4A-4I, assume that there is also a node R8 that is connected to R4 and to R7 in the branch of the shortest path tree that excludes F. While walking down the branch and sequentially evaluating the member nodes, the repair for node R6 may include a repair label that corresponds to R5, whereas the repair for node R8 may include a repair label that corresponds to R4. When R7 is then evaluated, there are two repairs possible to serve as the repair for R7.

In some embodiments, when multiple repairs are possible for a node under evaluation, the system may enforce a tie-breaking strategy, to select the repair segment(s) to add to the repair for the node under evaluation. For example, as shown, the repair for R7 may include the R4 repair segment in its repair list, based on the repair for R6, or include the R5 repair segment in its repair list, based on the repair for R8. An example tie-breaking strategy is as follows: 1.) remove all repairs not within a repair list size budget (e.g., a threshold repair list size), 2.) then, remove the largest repair lists (optional), 3.) remove the repairs with a further release point (optional), and 4.) arbitrarily remove repairs, optionally favoring diversity (e.g., outgoing neighbor, last node, etc.).

Figure 6:
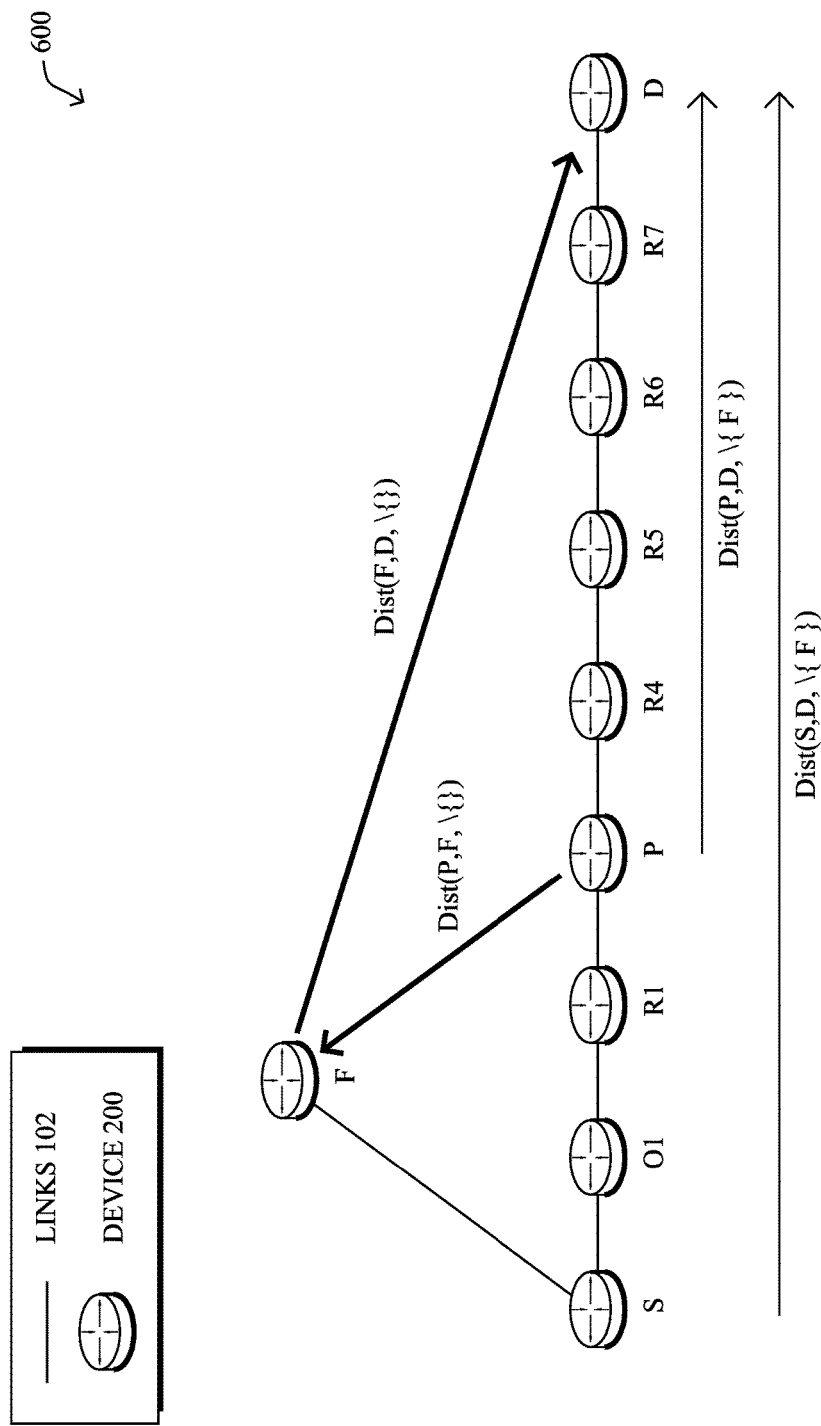
FIG. 6 illustrates the comparison of path distances.

FIG. 6 illustrates an example of path distances, in accordance with the techniques herein. As shown, the goal of the greedy evaluation is to enforce the shortest path from S, considering the failure of F. To do, so the system may step through the post-convergence path, greedily obtaining repair SID stacks $[s_1, s_2, \ldots, s_k]$ such that $s_i \rightarrow s_{i+1}$ is assessed to not pass through F in the initial topology.

In contrast to the prior examples in FIGS. 4A-4I, assume now that D is in the P-space of node P with respect to F. By definition, if this is true, the distance dist(P,D,\{F})<dist(P, F,\{ })+dist(F, D, \{ }). As would be appreciated, dist(P,D,\{F}) corresponds to dist(D)-dist(P) in the shortest path tree for S that excludes F, SPT(S, \{F}). Similarly, dist(P,F,\{ }) corresponds to dist(P) in the shortest path tree for F, rSPT(F,\{ }). Finally, dist(F, D, \{ }) corresponds to dist(D)-dist(F) in the post-convergence shortest path tree for S that includes F, SPT(S,\{ }). Thus, according to various embodiments, to protect all of the links in node-protection mode, a given router/node may compute two shortest path trees per link using the post-convergence paths: 1.) the node's own shortest path tree given the failure of its neighbor node, and 2.) the rSPT of the neighbor.

Figure 7:
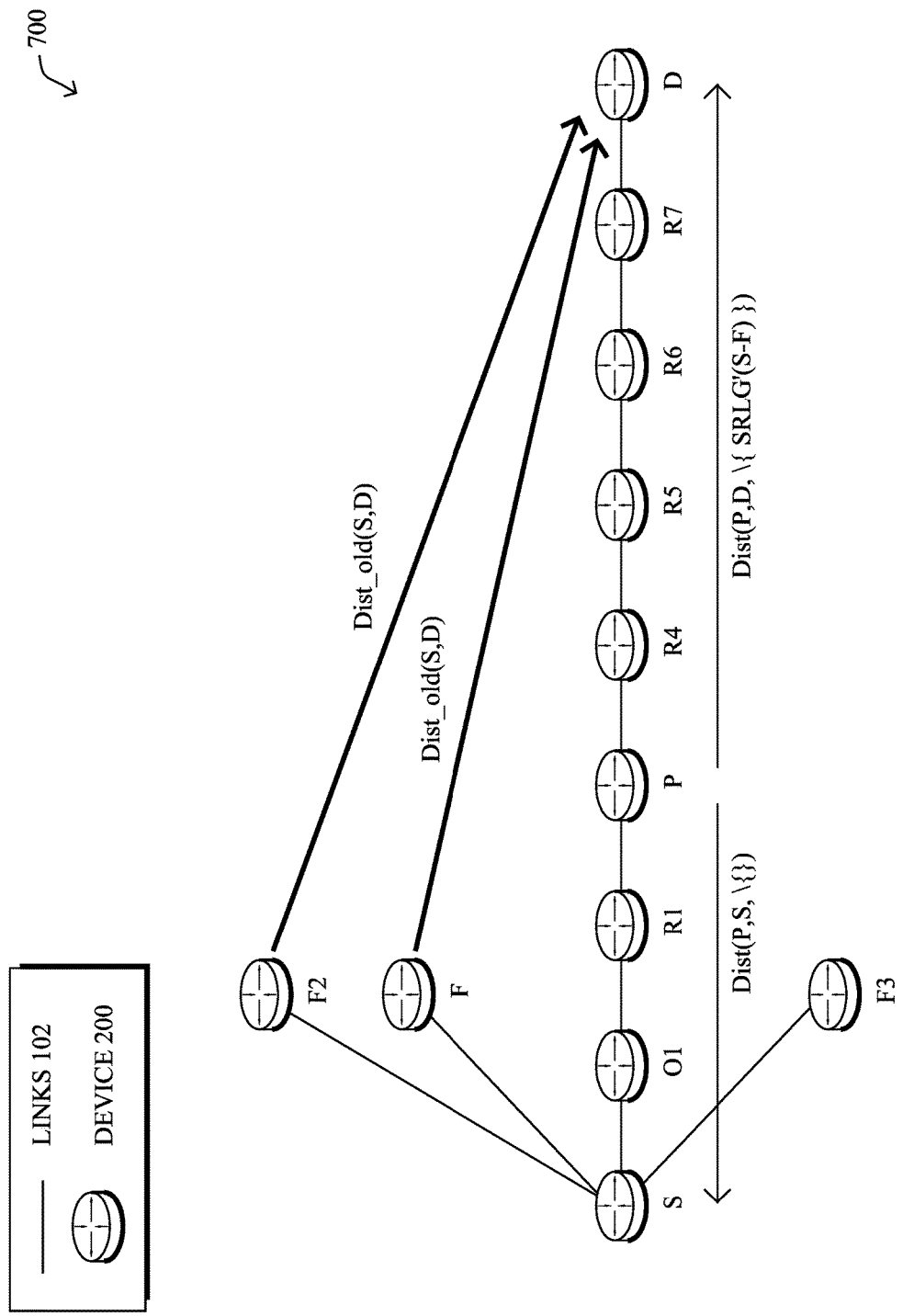
FIG. 7 illustrates the protection of a shared risk link group (SRLG)

FIG. 7 illustrates an example of the protection of an SRLG using the techniques herein, according to various embodiments. The techniques herein are particularly applicable in dual plane topologies where the SRLG is in the same plane. Here, the objective is to dive the demands to the other plane, even if metrics are such that basic link protection and/or node protection would keep the traffic within the plane. To enforce the shortest path from S to D, consider the failure of S-F and all adjacent links belonging to the same SRLG (e.g., S-F2, S-F3, etc.). In various embodiments, the techniques herein may sequentially evaluate the members of the post-convergence path, greedily obtain repair SID stacks $[s_1, s_2, \ldots, s_k]$ such that $s_i \rightarrow s_{i+1}$ is assessed not to pass through the set of adjacent links belonging to the same SRLG.

For example, as shown, assume that S-F, S-F2 (also used to reach D), and S-F3 (not used to reach D) are in the same SRLG. To compute and enforce the shortest paths from S given the failure of all of these links, these links may be excluded from the generated shortest path tree. In turn, while sequentially evaluating the nodes in the resulting tree, the system may ensure that none of the intermediate steps are through S-F, S-F2, or S-F3. In other words, the system may evaluate the stack $[s_1, s_2, \ldots, s_k]$ such that $s_i \rightarrow s_{i+1}$ is assessed to not pass through S. In other words, in the SRLG-protection mode, the system may use RP(P,D,S) instead of RP(P,D,SRLG'(S-F)) when evaluating step P→D. Notably, if P uses S to reach D, it consequently uses link S-F to reach D and it is not safe, no matter its use of the other links of the SRLG. Consequently, evaluating RP(P,D,S) is equivalent to evaluating RP(P,D,SRLG'(S-F)) in this case.

In terms of complexity, using the above approach to protecting an SRLG has similar complexity to protecting a single link, but with a different post-conference shortest path tree that is evaluated. A router protecting all of its links in SRLG mode will then only need to compute the following shortest path trees: the primary tree rSPT(S,\{ }) that traverses the SRLG and one shortest path tree per protected link (e.g., a tree that excludes that link given a failure of the SRLG).

Pseudocode for the techniques herein is as follows:
Point of Local Repair: S
Protected node: F
Extended P-Space is used
Assumptions
  SPT_old(S) is known.
  Nodes that are not downstream of F in SPT_old(S) are assumed to be flagged as belonging to the P-Space of S w.r.t. F, denoted as P-Space(S,F)
  rSPT(F) is known.
  SPT_new(SMFD, the SPT of S considering the failure of F is known (or under-going computation)
Data Structures
  Repair is a record data structure encoding a repair
  //type of repair, either "LFA", "TI-LFA", or "None"
  type;
  // directly connected neighbor to use for that repair
  outgoing_neighbor;
  //list of segments to use for that repair
  repair_list;
  Repair_sets maps each node N to a set of LFA_list or Repair_list structures that are valid to protect destination node N.
P-Space Check
If (Y in P-Space(S, F)): //Local P-Space check for destination Y at S
  Repair temp=new Repair(Type="None");
  Repair_sets(Y).add(temp)
  continue; //No need to try and protect Y
//If this code is reached, Y is not in the P-Space Post-Convergence LFA Check
//(Could re-use already computed post-convergence LFA state if any)
FOR EACH outgoing_neighbor O for Y in SPT_new(S, {F})):
　IF (RP(O,Y,F)): //Remote P-Space check for destination Y from O using RP function
　　Repair_list temp=new Repair_list(
　　　Type=LFA
　　　temp.outgoing_neighbor=O
　　　temp.repair_list=None
　　);
　Repair_list_sets(Y).add(temp);
IF Repair_list_sets(Y) is not empty:
　continue;
　//post-convergence LFA's have been found for Y, no need to look for ti-lfa
//If this code is reached, Y is not protected with LFA, a ti-lfa repair must be found
FOR EACH link X→Y in SPT_new(S,\{F}), do:
//Go across the protection state of each upstream neighbor of Y and build the one of Y
//Note: the FOR loop only iterates over the links directed to Y in the SPT_new, it is not a loop on all links of SPT_new.
FOR EACH RL in Repair_set(X):
//Note This loop iterates over each repair found for each node X that is a predecessor of Y in //SPT_new
　IF RL.type=="None":
　　//Case where Node X is in the P-Space, and next node Y is not LFA protectable
　　FOR EACH outgoing_neighbor O for X
　　　Repair temp=new Repair(
　　　　Type=TI-LFA
　　　　outgoing_neighbor=O
　　　　repair_list=[X]);
　　　IF(not RP(X,Y,\{F})):
　　　　//X does not use X→Y to reach Y, adj sid needed
　　　　temp.repair_list.append(Adj(X→Y))
　　　Repair_sets(Y).add(temp);
　IF RL.type==LFA:
　　//Case where Node X is not in the P-Space but has a post-convergence
　　LFA and //next node Y is not LFA protectable
　　Repair temp=new Repair(
　　　Type=TI-LFA
　　　temp.outgoing_neighbor=RL.outgoing_neighbor
　　　temp.repair_list=[X]);
　　IF(not RP (X,Y,F)):
　　　//X does not even use X→Y to reach Y, adj sid needed
　　　temp.repair_list.append(Adj(X→Y))
　　Repair_list_sets(Y).add(temp);
　IF RL.type==TI-LFA
　　/*Case where node X is not in the P-Space and the repair type previously found for X is a ti-lfa repair. X is thus protected with a sequence of intermediate SIDs). We thus create a repair list for Y using the previous repair list for X*/
　　/*We know that we can safely reach X using its repair list, and complete
　　repair list to reach Y*/Repair
　　temp=RL.copy( )
　　Last=temp.repair_list.last( )
　　//Variable Last denotes the last step of the repair list of X.
　　//We use it as a starting point to create the repair list for Y.
　　IF (not RP(Last, Y, F)):
　　　//Cannot go directly from Last to Y
　　　//Repair by reaching X using its repair list, then reach Y from X
　　　temp.repair_list.append(X);
　　　IF(not XP-Space(X,Y, F)):
　　　　//X does not even use X→Y to reach Y, adj sid needed
　　　　temp.repair_list.append(Adj(X→Y))
　　//Note: IF RP(Last, Y, S) is true, then the initial value for temp repair,
　　which //was set to the repair of X, is valid, and can be added as is to the set of repair lists found for Y.
　　Repair_sets(Y).add(temp)
　　Repair_sets(Y).applyTieBreaks( )
Repair List Tie-Breaking
Upon execution of Repair_sets(Y).add(temp):
1. Do not duplicate equal repair lists (coming from ECMP upstream nodes)
ID: outgoing_neighbor, repair_list
2. If Numerical upper bound on number of repairs found for Y is passed:
　Until upper bound becomes respected:
　　Either, and by order of preference:
　　Remove a non-shortest repair list, (the longest one)
　　Remove a repair with non-closest last node, (the one with furthest Last)
　　(Remove a repair with non-closest p-node, (the one w/furthest p-node))
　　(Remove a non SRLG-compliant repair list)
　　Arbitrarily remove a repair list
　　　Favor diversity of outgoing neighbor
Repair List Selection
　This process propagates multiple repair lists during the walk on SPT_new(S), to favor diversity of available repairs along a given brench of the SPT. It may, however, be required to select one single repair to download in the FIB for a given node. In this case, the repair list selection is performed by hashing on the destination prefix, to randomly select among the available repairs for the corresponding destination node As would be appreciated, the above pseudocode is illustrative only and that any number of variations are possible. For example, the above pseudocode may be adapted by one skilled in the art as needed for deployment to various types of systems and devices with different capabilities.

Figure 8:
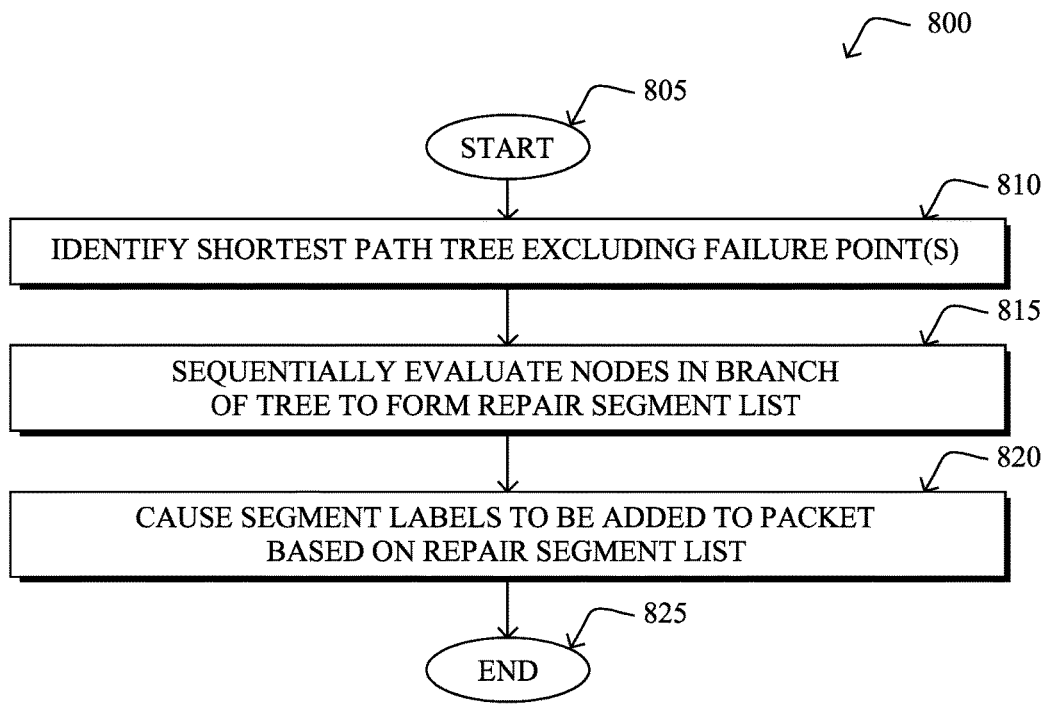
FIG. 8 illustrates an example simplified procedure for performing a fast reroute in a network.

FIG. 8 illustrates an example simplified procedure for performing a fast reroute in a network, in accordance with one or more embodiments described herein. In general, procedure 800 may be performed by any non-generic, specialized networking device by executing specialized instructions (e.g., process 248). The procedure 800 may start at step 805, and continues to step 810, where, as described in greater detail above, the device may identify a shortest path tree that excludes one or more failure points for which protection is desired. In some embodiments, the failure point(s) may include a particular link, node, or SRLG that is excluded from the shortest path tree. For example, the tree may exclude a particular link, one or more links for an excluded node, or one or more links associated with an SRLG.

At step 815, as detailed above, the device may sequentially evaluate the member nodes in a branch of the shortest path tree from step 810, to form a repair segment list. In other words, the device may greedily "walk" down the branch, to determine whether a repair is needed for the current member node under evaluation. Generally, the repair for the node may be based on any repairs already identified for any previously evaluated nodes in the branch. In various embodiments, the evaluation of the current node may entail determining whether the node is in the P-space of a reference node with respect to the point(s) of failure excluded from the shortest path tree. As described above, the P-space of the reference node comprises the set of nodes that the reference node can reach when the point(s) of failure are excluded. Initially, the reference node may be point of local repair. However, if the current node under evaluation is outside of the P-space of the point of local repair, the device may then update the reference node to be the next hop of the point of local repair and evaluate whether the current node is in the next hop's P-space. When a P-space boundary of a reference node is reached, the device may, in some cases, add a corresponding repair segment identifier (SID) to the repair list.

At step 820, the device may cause one or more segment labels to be added to a header of a packet based on the repair segment list, as described in greater detail above. In various embodiments, the device may do so in response to a failure in the network associated with the at least one link excluded from the shortest path tree. For example, when a failure is detected for the protected node, the point of local repair may add the segment labels from the repair list to the header of the packet, to send the packet along the repair path evaluated in step 815. Procedure 800 then ends at step 825.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a guaranteed backup path for node and local SRLG (e.g., a set of links attached to the point of local repair) in any network. Further, the techniques herein do not require targeted LDP sessions, such as in DLFA and, contrary to DLFA, provides the optimum backup path from capacity planning and service level agreement (SLA) standpoints. In addition, the techniques herein let the protection path take place over the new shortest paths from the node performing FRR to the destination, thereby following the new optimum behavior as expressed in the link metric configuration performed by the network operator. The techniques herein also scale with the computation of shortest path trees in the network, one of which is the current shortest path tree of the point of local repair, which is already computed by any router using IGP.

While there have been shown and described illustrative embodiments that provide for performing FRR in a network, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of network configurations. In addition, while certain protocols are shown, such as IGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
identifying, by a device in a network, a shortest path tree for a point of local repair in the network that excludes at least one link between the point of local repair and a neighbor of the point of local repair in the network;
sequentially evaluating, by the device, member nodes of a branch of the shortest path tree from the point of local repair to a destination node in the shortest path tree by:
making, by the device, a determination as to whether a member node currently under evaluation is in a P-space of a reference member node in the branch between the member node currently under evaluation and the point of local repair, wherein the P-space for the reference node comprises a set of nodes that are reachable by the reference node without traversing the at least one link excluded from the shortest path tree;
adding, by the device, a repair segment associated with a member node that is in the P-space of the reference node to a repair segment list, when the determination indicates that the member node currently under evaluation is not in the P-space of the reference member node; and
setting, by the device, the member node currently under evaluation as the reference node, when the determination indicates that the member node currently under evaluation is not in the P-space of the reference member node; and
causing, by the device, one or more segment routing labels to be added to a header of a packet based on the repair segment list and in response to a failure in the network associated with the at least one link excluded from the shortest path tree.

2. The method as in claim 1, wherein the shortest path tree excludes a shared risk link group (SRLG) associated with the at least one link excluded from the shortest path tree.

3. The method as in claim 1, wherein the shortest path tree excludes the neighbor of the point of local repair.

4. The method as in claim 1, further comprising:
applying, by the device, a tie-breaking strategy to select a repair segment to add to the repair segment list, when multiple repair segments are identified for an evaluated member node of the branch.

5. The method as in claim 4, wherein applying the tie-breaking strategy comprises:
determining, by the device, whether any of the identified repair segments are outside of a budget associated with the repair segment list.

6. The method as in claim 1, wherein the one or more segment routing labels comprises an adjacency segment label associated with the destination node.

7. The method as in claim 1, further comprising:
detecting, by the device, the failure in the network associated with the at least one link excluded from the shortest path tree.

8. An apparatus, comprising:
one or more network interfaces to communicate with a network;
a processor coupled to the one or more network interfaces and configured to execute a process; and
a memory configured to store the process executable by the processor, the process when executed operable to:
identify a shortest path tree for a point of local repair in the network that excludes at least one link between the point of local repair and a neighbor of the point of local repair in the network;
sequentially evaluate member nodes of a branch of the shortest path tree from the point of local repair to a destination node in the shortest path tree by:
making a determination as to whether a member node currently under evaluation is in a P-space of a reference member node in the branch between the member node currently under evaluation and the point of local repair, wherein the P-space for the reference node comprises a set of nodes that are reachable by the reference node without traversing the at least one link excluded from the shortest path tree;
adding a repair segment associated with a member node that is in the P-space of the reference node to a repair segment list, when the determination indicates that the member node currently under evaluation is not in the P-space of the reference member node; and
setting the member node currently under evaluation as the reference node, when the determination indicates that the member node currently under evaluation is not in the P-space of the reference member node; and
cause one or more segment routing labels to be added to a header of a packet based on the repair segment list and in response to a failure in the network associated with the at least one link excluded from the shortest path tree.

9. The apparatus as in claim 8, wherein the shortest path tree excludes a shared risk link group (SRLG) associated with the at least one link excluded from the shortest path tree.

10. The apparatus as in claim 8, wherein the shortest path tree excludes the neighbor of the point of local repair.

11. The apparatus as in claim 8, wherein the process when executed is further operable to:
apply a tie-breaking strategy to select a repair segment to add to the repair segment list, when multiple repair segments are identified for an evaluated member node of the branch.

12. The apparatus as in claim 11, wherein the apparatus applies the tie-breaking strategy by:
determining whether any of the identified repair segments are outside of a budget associated with the repair segment list.

13. The apparatus as in claim 8, wherein the one or more segment routing labels comprises an adjacency segment label associated with the destination node.

14. The apparatus as in claim 8, wherein the process when executed is further operable to:
detect the failure in the network associated with the at least one link excluded from the shortest path tree.

15. A tangible, non-transitory, computer-readable medium storing program instructions that, when executed by a device in a network, cause the device to perform a process comprising:
identifying, by the device, a shortest path tree for a point of local repair in the network that excludes at least one link between the point of local repair and a neighbor of the point of local repair in the network;
sequentially evaluating, by the device, member nodes of a branch of the shortest path tree from the point of local repair to a destination node in the shortest path tree by:
making, by the device, a determination as to whether a member node currently under evaluation is in a P-space of a reference member node in the branch between the member node currently under evaluation and the point of local repair, wherein the P-space for the reference node comprises a set of nodes that are reachable by the reference node without traversing the at least one link excluded from the shortest path tree;
adding, by the device, a repair segment associated with a member node that is in the P-space of the reference node to a repair segment list, when the determination indicates that the member node currently under evaluation is not in the P-space of the reference member node; and
setting, by the device, the member node currently under evaluation as the reference node, when the determination indicates that the member node currently under evaluation is not in the P-space of the reference member node; and
causing, by the device, one or more segment routing labels to be added to a header of a packet based on the repair segment list and in response to a failure in the network associated with the at least one link excluded from the shortest path tree.

16. The computer-readable media as in claim 15, wherein the shortest path tree excludes a shared risk link group (SRLG) associated with the at least one link excluded from the shortest path tree.

17. The computer-readable media as in claim 15, wherein the shortest path tree excludes the neighbor of the point of local repair.

18. The computer-readable media as in claim 15, wherein the process further comprises:
applying, by the device, a tie-breaking strategy to select a repair segment to add to the repair segment list, when multiple repair segments are identified for an evaluated member node of the branch.

19. The computer-readable media as in claim 18, wherein applying the tie-breaking strategy comprises:
determining, by the device, whether any of the identified repair segments are outside of a budget associated with the repair segment list.

20. The computer-readable media as in claim 15, wherein the one or more segment routing labels comprises an adjacency segment label associated with the destination node.

* * * * *

UNITED STATES PATENT AND TRADEMARK OFFICE
CERTIFICATE OF CORRECTION

PATENT NO. : 10,462,045 B1
APPLICATION NO. : 15/431560
DATED : October 29, 2019
INVENTOR(S) : Pierre Jean-Rene Francois It is certified that error appears in the above-identified patent and that said Letters Patent is hereby corrected as shown below:

In the Specification

Column 6, Line 66, please amend as shown:
point of local repair (denoted 'S') is connected to a desti- Column 10, Line 48, please amend as shown:
SPT_new(S,\{F}), the SPT of S considering the failure of Column 10, Line 49, please amend as shown:
F is known (or undergoing computation)

Column 11, Line 10, please amend as shown:
temp.outgoing_neighbor=O

Signed and Sealed this
Twenty-first Day of January, 2020

Andrei Iancu
*Director of the United States Patent and Trademark Office*